US012779512B2

(12) United States Patent
Wilson et al.

(10) Patent No.: US 12,779,512 B2
(45) Date of Patent: Nov. 3, 2026

(54) G-TUBE BLOCKAGE BLASTER

(71) Applicant: THE UNIVERSITY OF TOLEDO, Toledo, OH (US)

(72) Inventors: Hunter Wilson, Wauseon, OH (US); Nicholas Reed, Wauseon, OH (US); Fahad Alharthi, Wauseon, OH (US); Madeline Winters, Wauseon, OH (US); Harini Pasupuleti, Wauseon, OH (US)

( * ) Notice: Subject to any disclaimer, the term of this patent is extended or adjusted under 35 U.S.C. 154(b) by 131 days.

(21) Appl. No.: 18/579,710

(22) PCT Filed: Jul. 15, 2022

(86) PCT No.: PCT/US2022/037271

§ 371 (c)(1),
(2) Date: Jan. 16, 2024

(87) PCT Pub. No.: WO2023/288051

PCT Pub. Date: Jan. 19, 2023

(65) Prior Publication Data

US 2024/0342766 A1 Oct. 17, 2024

Related U.S. Application Data

(60) Provisional application No. 63/222,460, filed on Jul. 16, 2021.

(51) Int. Cl.
*B08B 9/032* (2006.01)
*A61J 15/00* (2006.01)

(52) U.S. Cl.
CPC ......... *B08B 9/0321* (2013.01); *A61J 15/0015* (2013.01); *B08B 2209/032* (2013.01)

(58) Field of Classification Search
CPC .............. B08B 9/0321; B08B 2209/032; A61J 15/0015
See application file for complete search history.

(56) References Cited

U.S. PATENT DOCUMENTS

| | | | | |
|---|---|---|---|---|
| 5,527,280 A * | 6/1996 | Goelz | A61J 15/0069 | 604/103.1 |
| 5,709,691 A * | 1/1998 | Morejon | A61M 1/83 | 128/207.14 |
| 6,494,208 B1 * | 12/2002 | Morejon | A61M 1/83 | 128/207.14 |
| 8,133,326 B2 * | 3/2012 | Bracken | A61M 16/0488 | 128/207.14 |
| 2005/0172971 A1 * | 8/2005 | Kolobow | A61M 16/0463 | 128/207.14 |

(Continued)

*Primary Examiner* — Sharidan Carrillo
(74) *Attorney, Agent, or Firm* — Gutwein Law; Tyler B. Droste

(57) ABSTRACT

A G-tube blockage blaster comprising: an elongated shaft comprising a rigid material and extending from a proximal end to a distal end; a hub on the proximal end; and a balloon on the distal end; wherein the elongated shaft includes a first lumen extending from the hub to a balloon hole at a position removed from a tip at the distal end; wherein the elongated shaft includes a second lumen extending from the hub to a fluid hole at the distal end; and wherein the hub includes a balloon inflation port configured to allow injection of a first fluid into the first lumen, and a fluid delivery port configured to allow injection of a second fluid into the second lumen.

5 Claims, 17 Drawing Sheets

(56) References Cited

U.S. PATENT DOCUMENTS

| | | | | |
|---|---|---|---|---|
| 2015/0165496 | A1* | 6/2015 | Moreau | A61M 39/10<br>134/22.12 |
| 2024/0342766 | A1* | 10/2024 | Wilson | A61J 15/0026 |

* cited by examiner

G-TUBE BLOCKAGE BLASTER

RELATED APPLICATIONS

This application is the United States national phase of International Application No. PCT/US22/37271 filed on Jul. 15, 2022, and claims priority to U.S. Provisional Application No. 62/222,460 filed under 35 U.S.C. § 111(b) on Jul. 16, 2021, the disclosure of which is incorporated herein by reference in its entirety for all purposes.

STATEMENT REGARDING FEDERALLY SPONSORED RESEARCH

This invention was made with no government support. The government has no rights in this invention.

BACKGROUND

A percutaneous endoscopic gastrostomy tube (PEG tube), also known as a gastrostomy tube or simply a G-tube, is a tube that is inserted into the abdomen of a patient and used to release nutrition, hydration, and medications directly into the stomach. The G-tube is surgically implanted into patients who have difficulty eating by mouth, cannot physically swallow safely, or who require additional nutritional supplements. Replacing G-tubes requires surgical intervention.

G-tubes become clogged because of improper pill amalgamation. Medication is administered through the G-tube and medication is not always available in liquid form. When medication comes in the form of pills, a clinician has to pulverize and disintegrate the solid pill into a liquid that can be pushed through the G-tube. Clogs in G-tubes arise when the pulverization and disintegration process is not done adequately. Pill fragments become stuck in the tube, and over time, those pill fragments turn into hardened material that cannot be flushed out of the tube.

Estimates of the incidence of clogged feeding tubes range widely, from 12.5% to 45% over the life of a tube. The substantial majority of clogged G-tubes cannot be cleared at the patient's bedside, and the patients have to be transported to the hospital accordingly. This can increase the risk of infection and morbidity for the patient. Furthermore, many patients who have G-tubes have dementia, because they sometimes forget to swallow or will spit out and pocket their food due to their mental status. A trip to an emergency room affects the mental condition of dementia patients because it disrupts their surroundings, and can escalate or exacerbate their dementia, which in turn also impacts their physical health. This transport can continue to impact the patient even after they are readmitted back to their home outpatient facility as they continue to fight off infection that was contracted in acute care facilities.

There is also a lot of waste in terms of time and money that occurs as a result of clogged G-tubes. The patient and the patient's insurance, if applicable, can be billed thousands of dollars for transportation, the hospital stay, and surgery. The medical team assigned to the patient must consume their time with this straightforward case. The time and energy used to get the patient to the hospital, as well as for postoperative care, could be spent elsewhere.

There is a need in the art for new and improved devices for unclogging clogged G-tubes.

SUMMARY

Provided is a G-tube blockage blaster comprising an elongated shaft comprising a rigid material and extending from a proximal end to a distal end; a hub on the proximal end; and a balloon on the distal end; wherein the elongated shaft includes a first lumen extending from the hub to a balloon hole at a position removed from the distal end; wherein the elongated shaft includes a second lumen extending from the hub to a fluid hole at the distal end; and wherein the hub includes a balloon inflation port configured to allow injection of a first fluid into the first lumen, and a fluid delivery port configured to allow injection of a second fluid into the second lumen.

In certain embodiments, the rigid material is stainless steel or a hard plastic. In certain embodiments, the elongated shaft and the hub are composed entirely of the rigid material.

In certain embodiments, the balloon is configured to be inflated from the first fluid injected into the first lumen. In certain embodiments, the balloon is inflatable to a diameter ranging from about 4.6 mm to about 24 mm. In certain embodiments, the balloon is inflatable to a diameter ranging from about 9.3 mm to about 16 mm. In certain embodiments, the balloon is inflatable to a diameter of about 12 mm.

In certain embodiments, the hub is removable from the elongated shaft.

In certain embodiments, the hub is connected to the proximal end with a plurality of hub connection clamps that grip a tube connection member defining a central core receiving the proximal end so as to secure the proximal end within the central core.

In certain embodiments, the balloon is secured to the elongated shaft with an adhesive. In certain embodiments, the balloon is molded to the elongated shaft.

In certain embodiments, the hub is secured to the elongated shaft with connection clamps. In certain embodiments, the hub is secured to the elongated shaft with an adhesive. In certain embodiments, the hub is molded to the elongated shaft.

In certain embodiments, the hub includes a first lumen section extending through the hub from the proximal end of the elongated shaft to the balloon inflation port, and a second lumen section extending through the hub from the proximal end of the elongated shaft to the fluid injection port. In particular embodiments, the first lumen section includes a curve or bend within the hub or a change in concavity within the hub, and the second lumen section is straight within the hub. In particular embodiments, the first lumen section and the second lumen section are mirror images of each other within the hub. In particular embodiments, the first lumen section and the second lumen section each extend within the hub at an angle relative to a plane defined by the elongated shaft.

Further provided is a method of clearing a blockage in a G-tube, the method comprising inserting an elongated shaft into a G-tube having a blockage therein, wherein the elongated shaft extends from a proximal end to a distal end, and wherein the elongated shaft defines a first lumen and a second lumen, the first lumen extending from the proximal end to a position removed from a tip at the distal end, and the second lumen extending from the proximal end to the distal end; moving the elongated shaft distally into the G-tube until the distal end reaches the blockage; injecting a first fluid into the first lumen so as to inflate a balloon attached to the elongated shaft; and injecting a second fluid into the second lumen so as to contact the blockage with the second fluid and clear the blockage from the G-tube. In certain embodiments, the shaft comprises a rigid material.

In certain embodiments, the first fluid is water or saline. In certain embodiments, the second fluid is water or saline.

In certain embodiments, the first fluid is water or saline, and the second fluid is water or saline.

In certain embodiments, the injecting of the first fluid is conducted with a syringe or a mechanical pump. In certain embodiments, the injecting of the second fluid is conducted with a syringe or a mechanical pump. In certain embodiments, the injecting of the first fluid is conducted with a syringe or a mechanical pump, and the injecting of the second fluid is conducted with a syringe or a mechanical pump.

Further provided is a device comprising an elongated shaft comprising a rigid material and extending from a proximal end to a distal end; and a hub on the proximal end; wherein the elongated shaft includes a first lumen extending from the hub to a balloon hole at a position removed from the distal end; wherein the elongated shaft includes a second lumen extending from the hub to a fluid hole at the distal end; and wherein the hub includes a balloon inflation port configured to allow injection of a first fluid into the first lumen, and a fluid delivery port configured to allow injection of a second fluid into the second lumen.

BRIEF DESCRIPTION OF THE DRAWINGS

FIG. 8A shows a top view. FIG. 8B shows a top view of the proximal region. FIG. 8C shows a side view. FIG. 8D shows a side view of the hub. FIG. 8E shows a distal view. FIG. 8F shows a proximal view.

FIG. 13A shows a top view. FIG. 13B shows a side view. FIG. 13C shows a distal view. FIG. 13D shows a proximal view.

DETAILED DESCRIPTION

Figure 1:
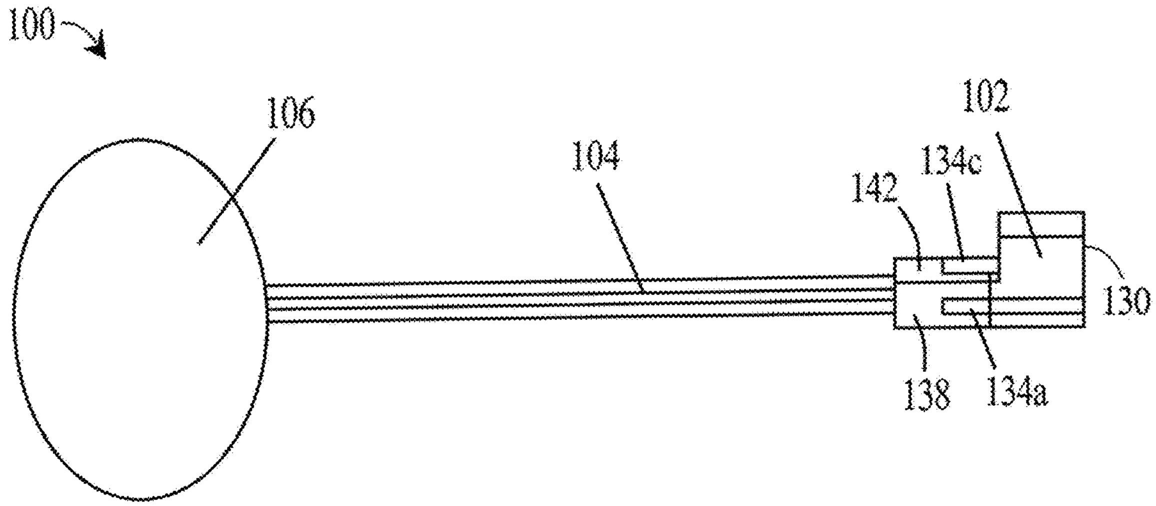
FIG. 1: Side view of a first embodiment of a G-tube blockage blaster.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Provided herein is a device, referred to as a G-tube blockage blaster, which can clear obstructions in clogged G-tubes easily and without surgical intervention. However, it is understood that the G-tube blockage blaster may be utilized to clear obstructions in tubes or lumens other than G-tubes, and such uses of the device are entirely encompassed within the scope of the present disclosure.

Referring now to FIGS. 1-8, depicted is a first embodiment of a G-tube blockage blaster 100. The G-tube blockage blaster 100 includes a hub 102, an elongated shaft 104, and a balloon 106. The hub 102 is located at the proximal end 108 of the elongated shaft 104, and the balloon 106 is located at the distal end 110 of the elongated shaft 104.

The elongated shaft 104 has a diameter $d_1$ that is not larger than the diameter of a G-tube, because the elongated shaft 104 should be capable of being inserted into a G-tube. Because the diameter of a G-tube is commonly 14f, 18f, or 24f, the diameter $d_1$ of the elongated shaft 104 may be, for example, about 4.5 mm, about 5.8 mm, or about 7.8 mm. However, many other diameters $d_1$ are possible and encompassed within the scope of the present disclosure. Similarly, the elongated shaft 104 should have a length L that is at least the length of a G-tube so as to be able to reach an obstruction anywhere in the G-tube. Furthermore, the cross-sectional shape of the elongated shaft 104 may vary.

The elongated shaft 104 is fabricated from a rigid material such as stainless steel or a hard plastic. Sterilizability of the materials is not a concern because G-tubes deliver contents into the stomach, where unsterilized food enters every day. Therefore, the rigid material need not be sterilizable. In some embodiments, the elongated shaft 104 is composed entirely out of the rigid material. In other words, the elongated shaft 104 is not a flexible tube such as a catheter. Advantageously, the use of a rigid material allows for the elongated shaft 104 to be more easily maneuvered through a G-tube, and also enables the elongated shaft 104 itself to be used to distally push an obstruction in a G-tube in addition to the flushing of fluid described herein. Such distal pushing of the obstruction may be successful in removing the obstruction upon inflation of the balloon 106, as discussed in more detail below. Moreover, the use of a rigid material for the elongated shaft 104 allows the G-tube blockage blaster 100 to act as a check to see if the G-tube is clear. That is, in some embodiments, the elongated shaft 104 is the same length as the G-tube, and so when the elongated shaft 104 is inserted into the G-tube such that the hub 102 makes contact with the G-tube, it indicates to the user that there are no obstructions in the G-tube, because the elongated shaft 104 has been inserted through the entire length of the G-tube. Alternatively, in cases where the elongated shaft 104 is longer than the length of a G-tube, the elongated shaft 104 may include markings on it to indicate to the user when the elongated shaft 104 is all the way through the G-tube. If the elongated shaft 104 cannot be pushed all the way through the G-tube, it is an indication that there is an obstruction present (or remaining) in the G-tube. In this manner, the G-tube blockage blaster 100 may be utilized to check whether there is an obstruction present in a G-tube.

Referring still to FIGS. 1-8, the elongated shaft 104 can include a first lumen 112 and a second lumen 118. In certain embodiments, the elongated shaft 104 only includes the first lumen 112. In other embodiments, the elongated shaft 104 includes at least the first lumen 112 and the second lumen 118. The first lumen 112 can extend from a first lumen terminal 114 at the proximal end 108 to a balloon hole 116 at a position on the elongated shaft 104 removed from the top at the distal end 110 (i.e., also removed from the fluid hole 122). The second lumen 118 can extend from a second lumen terminal 120 at the proximal end 108 to a fluid hole 122 at the distal end 110. The fluid hole 122 may have a diameter larger than the diameter of the balloon hole 116 so as to reduce the force needed to push fluid through, but this is not strictly necessary.

Figure 2:
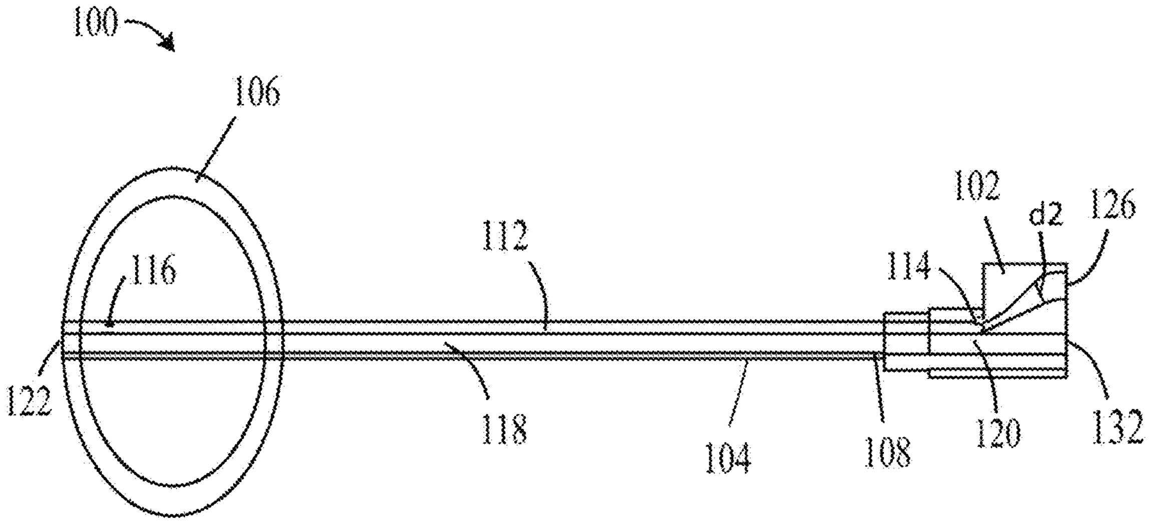
FIG. 2: Side perspective view of the first embodiment of the G-tube blockage blaster.

The hub 102 may be removable from the elongated shaft 104. Alternatively, the hub 102 may be integrated with the elongated shaft 104, and can be made from a single piece of material. The hub 102 may include a first lumen section 124 which aligns with the first lumen terminal 114 at the proximal end 108 of the elongated shaft 104, and extends through the hub 102 to a side 130 opposing the elongated shaft 104, where the first lumen section 124 terminates at a balloon inflation port 126. As seen in FIGS. 2, 8F, the first lumen section 124 has a diameter $d_2$ that changes within the hub 102, decreasing from a larger diameter at the balloon inflation port 126 to a smaller diameter at a tube connection member 136 which matches the diameter of the first lumen 112 within the elongated shaft 104. The first lumen section 124 may also have one or more curves or bends within the hub 102, or changes in concavity within the hub 102, as seen in FIGS. 2, 8C-8D.

The balloon 106 may be attached to the elongated shaft 104 with an adhesive. Alternatively, the balloon 106 may be molded onto the elongated shaft 104. The hub 102 may also be made to have a snap-on fit around the proximal end 108 of the elongated shaft 104. The balloon 106 may be inflated with air or other fluid injected through the balloon inflation port 126 and the first lumen 112, which exits the elongated shaft 104 through the balloon hole 116 into the balloon 106. However, because the balloon 106 does not extend over the distal end 110 of the elongated shaft 104, the fluid hole 122 is not covered by the balloon 106, and fluids can be flushed through the second lumen 118 and out of the fluid hole 122. For clarity, the term “fluid” as used herein may refer to air or other gas, or to a liquid such as saline or water, or any combination thereof. In some embodiments, the balloon 106 may be inflated to a diameter that is about twice the diameter of the G-tube having a blockage. Since G-tubes commonly have diameters of 14f, 18f, or 24f, the balloon 106 may be inflated to a diameter ranging from about 9.3 mm (about twice the diameter of a 14f tube) to about 16 mm (about twice the diameter of a 24f tube). In some embodiments, the balloon 106 may be inflated to a diameter of about 12 mm (about twice the diameter of a 18f tube). However, it is not necessary that the balloon 106 be inflated to a diameter that is about twice the diameter of the G-tube. Rather, other degrees of inflation, to other diameters, are entirely possible and encompassed within the scope of the present disclosure. In some embodiments, the balloon 106 may be inflated to a diameter that is about equal to the diameter of the G-tube. In some embodiments, the balloon 106 may be inflated to a diameter that is about 1.1 times the diameter of the G-tube. In some embodiments, the balloon 106 may be inflated to a diameter that is about 1.3 times the diameter of the G-tube. In some embodiments, the balloon 106 may be inflated to a diameter that is about 1.5 times the diameter of the G-tube. In some embodiments, the balloon 106 may be inflated to a diameter that is about 1.7 times the diameter of the G-tube. In some embodiments, the balloon 106 may be inflated to a diameter that is about 1.9 times the diameter of the G-tube. In some embodiments, the balloon 106 may be inflated to a diameter that is about 3 times the diameter of the G-tube. In some embodiments, the balloon 106 is inflatable to a diameter ranging from about 4.6 mm to about 24 mm.

The hub 102 may include a second lumen section 128 which aligns with the second lumen terminal 120 at the proximal end 108 of the elongated shaft 104, and extends through the hub 102 to a side 130 opposing the elongated shaft 104, where the second lumen section 128 terminates at a fluid delivery port 132. Fluid may be injected through the fluid delivery port 132, and through the second lumen 118, exiting through the fluid hole 122 at the distal end 110 of the elongated shaft 104. The exit of the injected fluid through the fluid hole 122 can provide a force sufficient to dislodge or push an obstruction within a G-tube when the balloon 106 is inflated adjacent to, or nearby, the obstruction.

Referring now to FIG. 2, a perspective view of the G-tube blockage blaster 100 is depicted. As seen in FIG. 2, the first lumen 112 is disposed within the elongated shaft 104 above the second lumen 118 (relative to the orientation of the hub 102), is not as long as the second lumen 118 within the elongated shaft 104, and is not as large in diameter as the second lumen 118. However, none of these characteristics is necessary. In alternative embodiments, the first lumen 112 may be the same size as, or larger in diameter than, the second lumen 118. In alternative embodiments, the first lumen 112 may be disposed below the second lumen 118 relative to the orientation of the hub 102. In alternative embodiments, the first lumen 112 may be the same length within the elongated shaft 104 as the second lumen 118, provided that the first lumen 112 still terminates in a balloon hole 116 that is removed from the distal end 110 of the elongated shaft 104.

Figure 3:
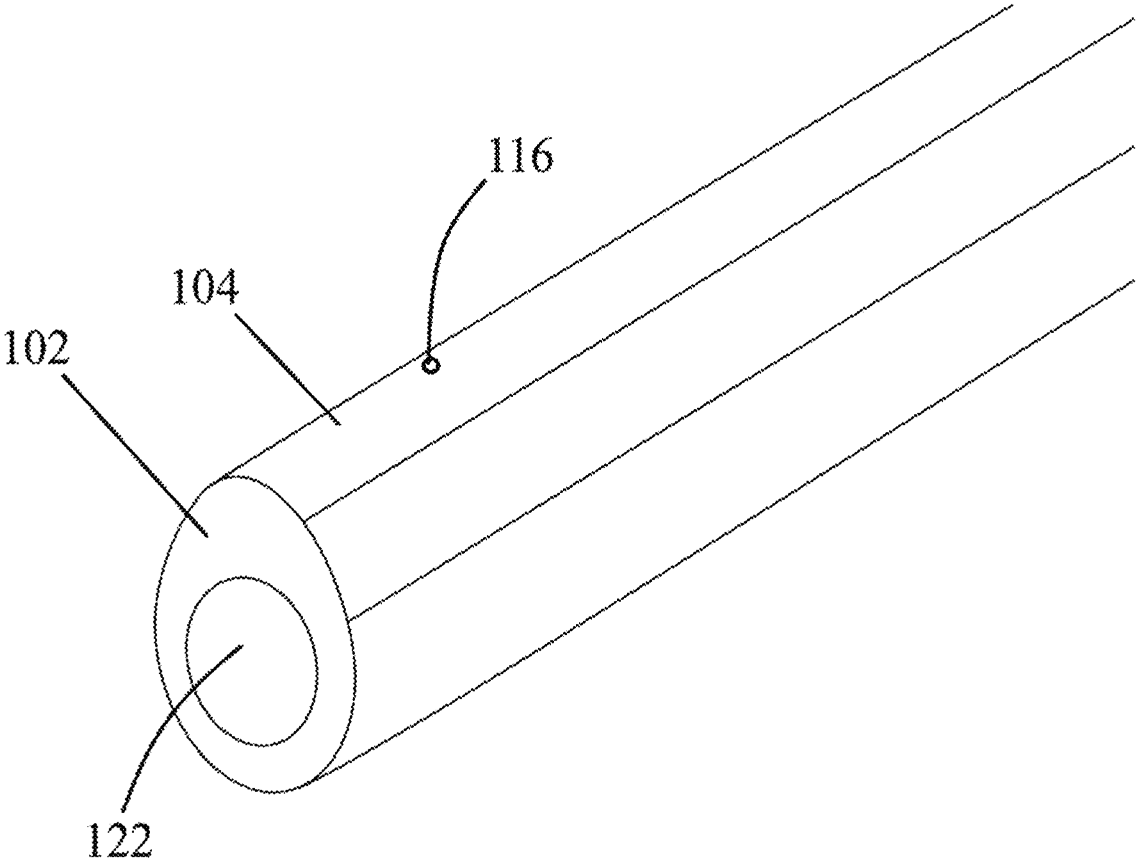
FIG. 3: Perspective view of the distal region of the first embodiment of the G-tube blockage blaster.

Referring now to FIG. 3, the elongated shaft 104 is depicted in the absence of the balloon 106 so as to better illustrate the balloon hole 116 and the fluid hole 122. The balloon hole 116 is located a distance away from the distal end 110 of the elongated shaft 104 to ensure that the balloon 106 does not cover the fluid hole 122 and thereby prevent fluids from being flushed out of the elongated shaft 104 through the second lumen 118.

Figure 4:
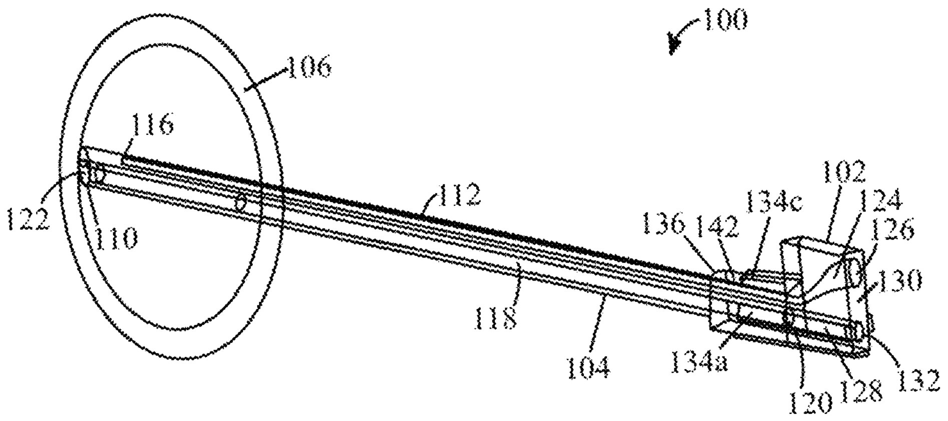
FIG. 4: Perspective view of the first embodiment of the G-tube blockage blaster.

Referring now to FIG. 4, a perspective view of the G-tube blockage blaster 100 is shown. As seen in FIG. 4, the hub 102 may include a curved first lumen section 124 extending from the elongated shaft 104 to the balloon inflation port 126, and a straight second lumen section 128 extending from the elongated shaft 104 to the fluid delivery port 132. However, while this configuration is convenient for the user, it is not strictly necessary. In alternative embodiments, the hub 102 may include a 90 degree or 45 degree elbow section for the first lumen section 124 and/or the second lumen section 128. The hub 102 effectively provides inlet ports 126, 132 to each of the first and second lumens 112, 118 in locations that are convenient for a user to attach a syringe or other injection device. If the hub 102 were not present, the first and second lumens 112, 118 would be too close together for simultaneous access to them with syringes or other injection devices.

Though the use of syringes is described, it is understood that it is not necessary to use syringes to provide fluid to the first lumen 112 or the second lumen 118. Rather, any method of injecting a fluid into the first lumen 112 or second lumen 118 may be utilized, and is encompassed within the scope of the present disclosure. This includes, but is not limited to, the use of hand cranks and foot pedal pumps.

Figure 5:
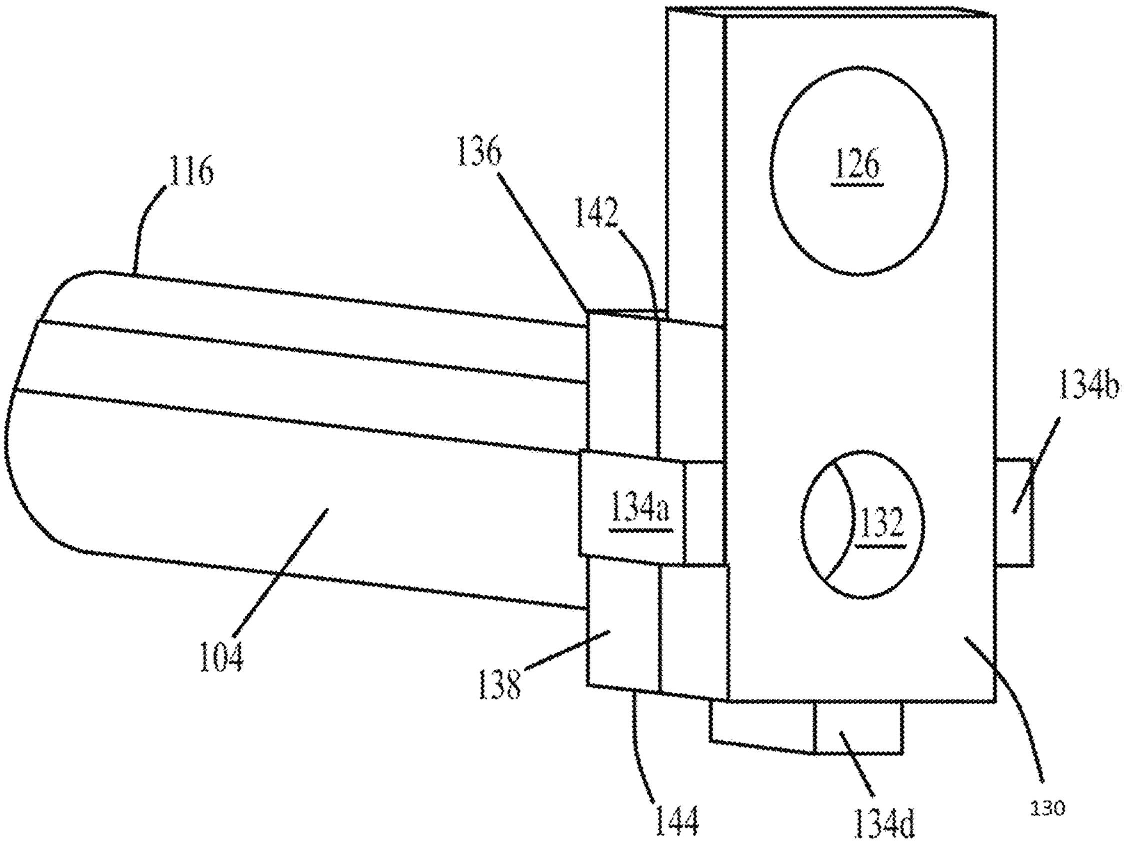
FIG. 5: Perspective view of the hub of the first embodiment of the G-tube blockage blaster.

Referring now to FIG. 5, a perspective view of the hub 102 is shown. In FIG. 4, the balloon inflation port 126 is depicted as being larger in diameter than the fluid delivery port 132. However, this is not necessary. The balloon inflation 126 port may have the same diameter as, or be smaller in diameter than, the fluid delivery port 132.

Figure 6:
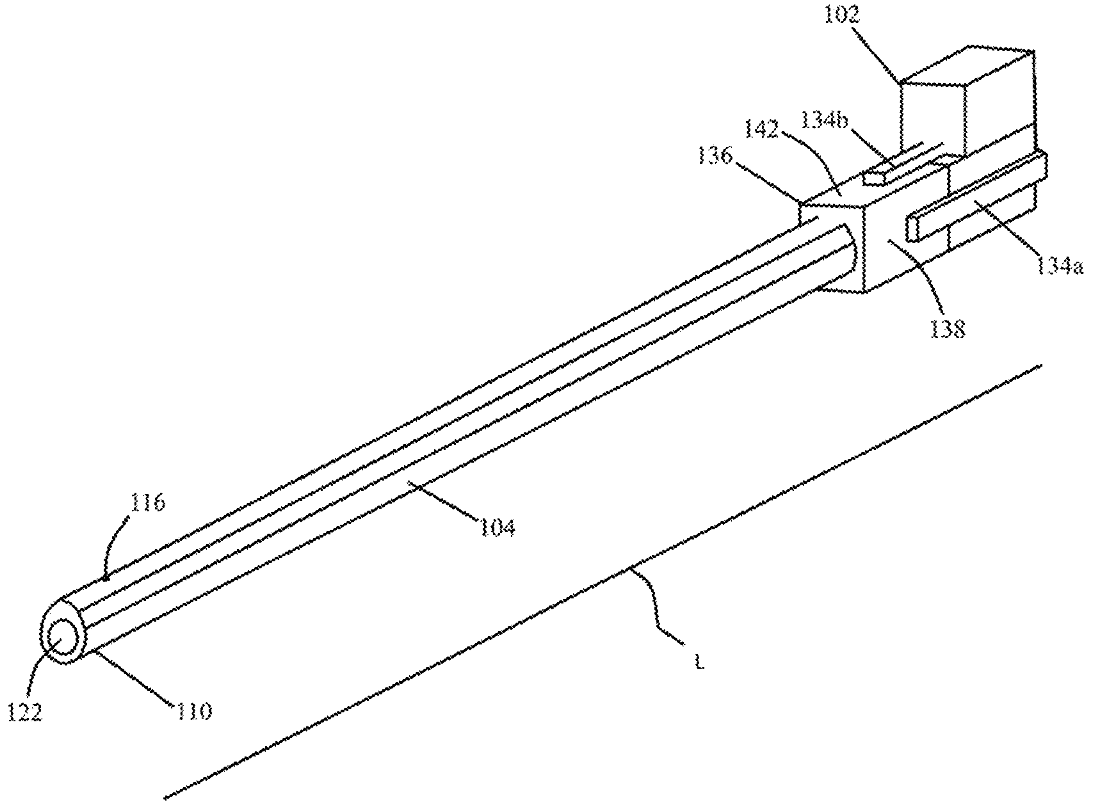
FIG. 6: Corner view of the first embodiment of the G-tube blockage blaster shown without the balloon for illustration purposes.
Figure 7:
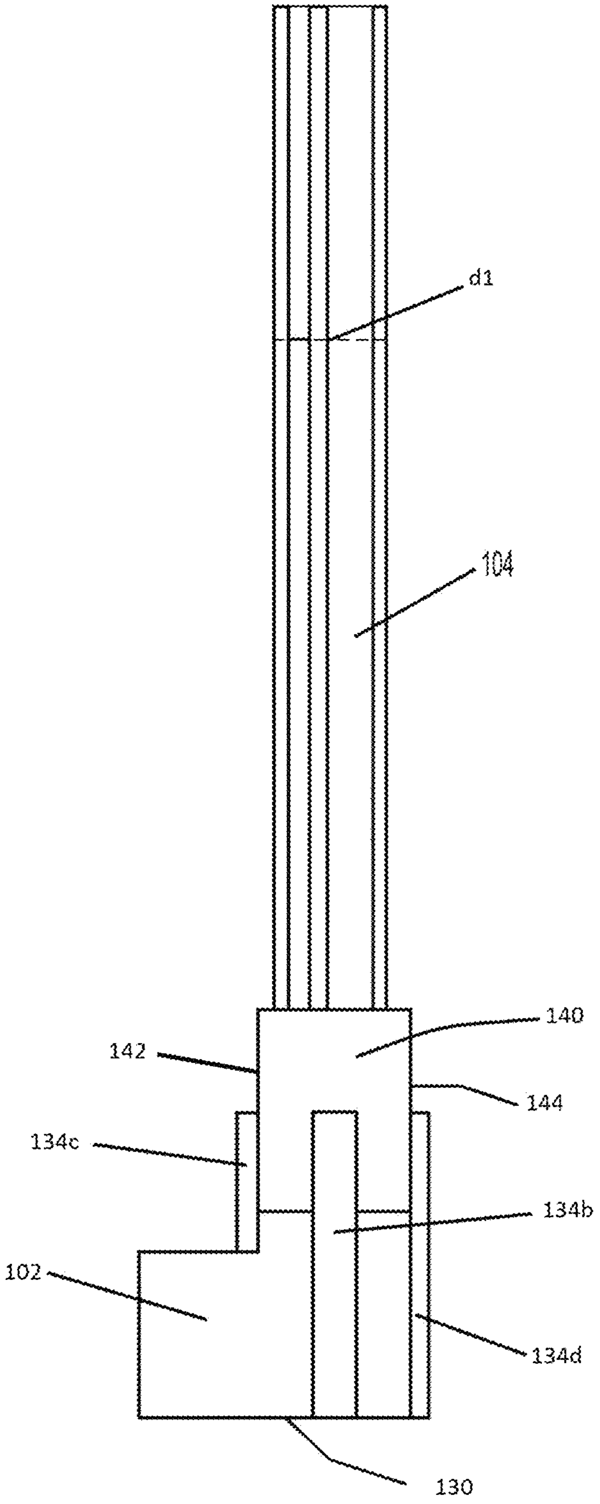
FIG. 7: Side view of the first embodiment of the G-tube blockage blaster showing the hub connection clamps.

Referring now to FIGS. 6-7, the hub 102 may include hub connection clamps 134 and a tube connection member 136. The tube connection member 136 may have a first hub connection clamp 134*a* on a first side 138, a second hub connection clamp 134*b* on the opposing second side 140, a third hub connection clamp 134*c* on the top side 142, and a fourth hub connection clamp 134*d* on the opposing bottom side 144. Each hub connection clamp 134*a*-134*d* helps hold in place the tube connection member 136 so as to grip down on the proximal end 108 of the elongated shaft 104, thereby connecting the hub 102 to the elongated shaft 104. The tube connection member 136 defines a central core having a diameter large enough to receive the proximal end 108 of the elongated shaft 104, but small enough to be able to clamp down on the elongated shaft 104 with the aid of the hub connection clamps 134*a*-134*d* so as to secure the hub 102 on the elongated shaft 104. The central core of the tube connection member 136 houses the proximal end 108 of the elongated shaft 104, and the hub connection clamps 134*a*-134*d* grip down on the tube connection member 136 to cause the tube connection member 136 to secure the proximal end 108 in place within the central core. However, many other methods of connecting the hub 102 to the elongated shaft 104 are possible and encompassed within the scope of the present disclosure. For example, the hub 102 may be secured to the elongated shaft 104 with an adhesive, or may be molded to the elongated shaft 104.

Figure 8A:
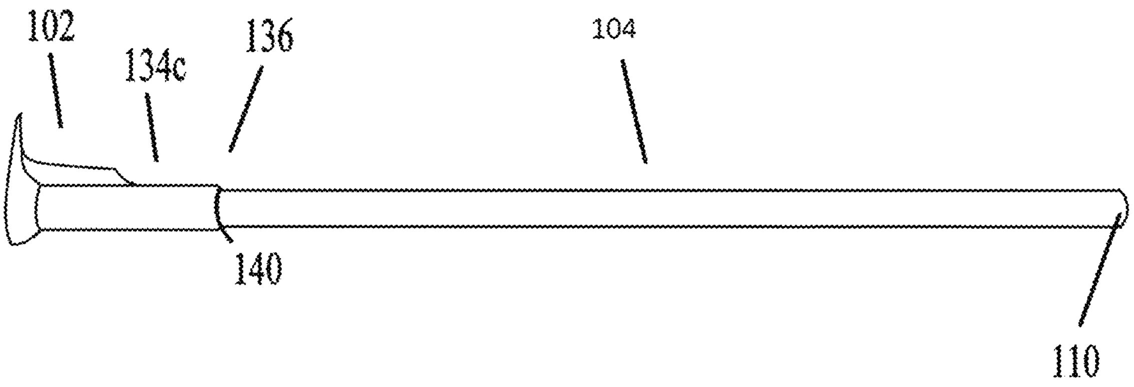
FIGS. 8A-8F: Photographs of a non-limiting example of the first embodiment of a G-tube blockage blaster.
Figure 8B:
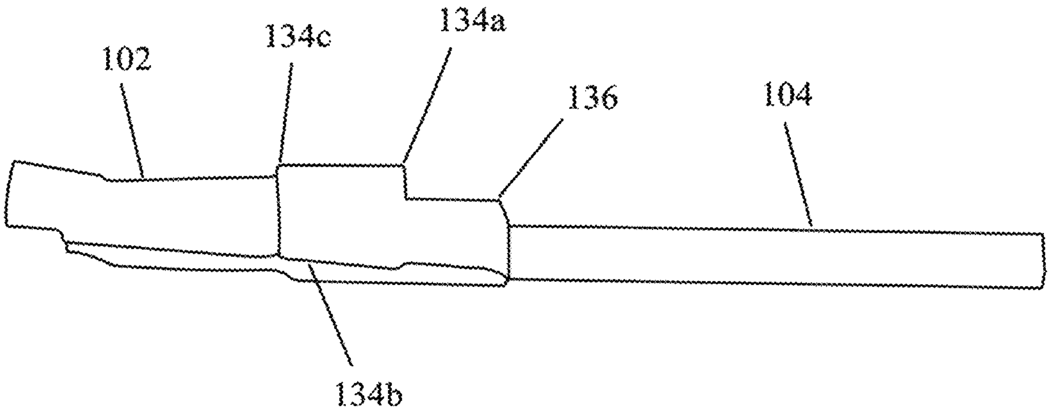
Figure 8C:
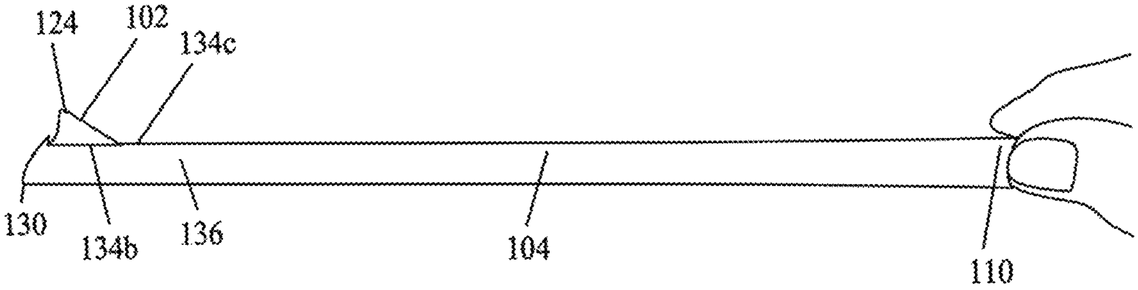
Figure 8D:
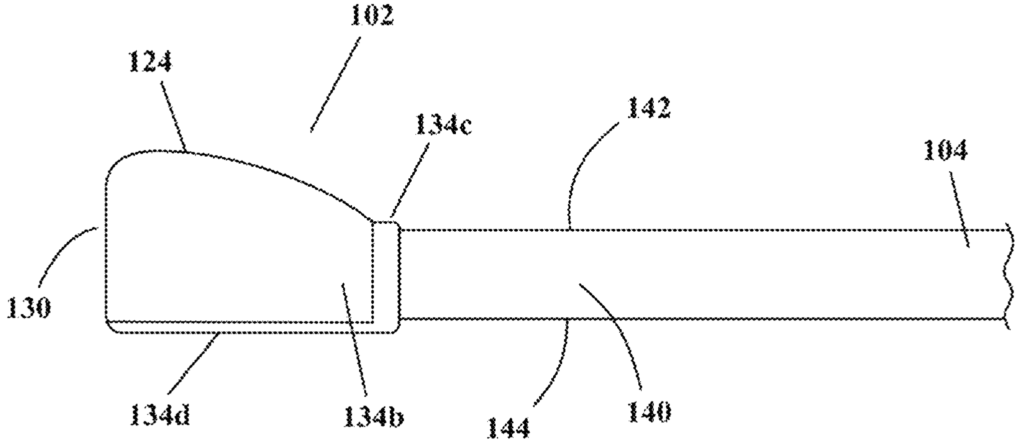
Figure 8E:
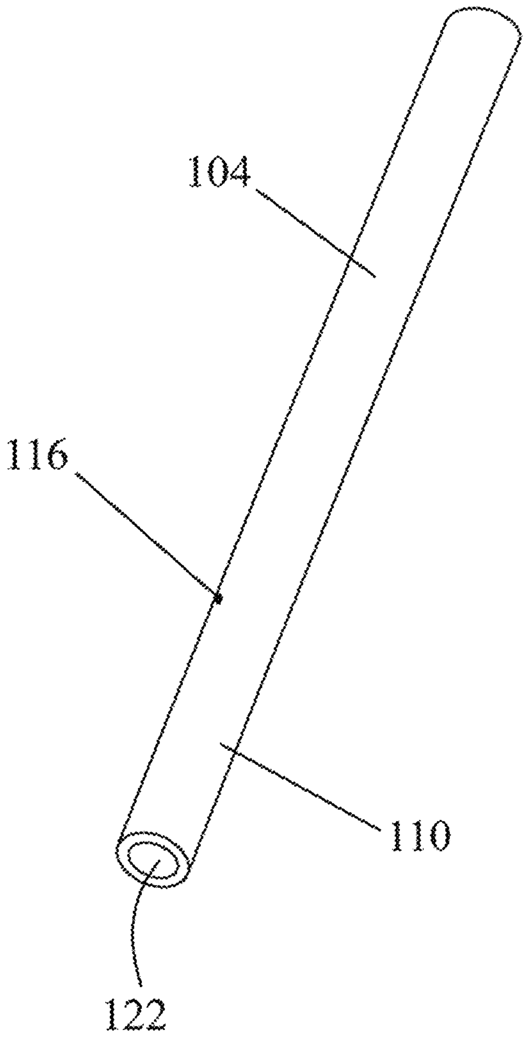
Figure 8F:
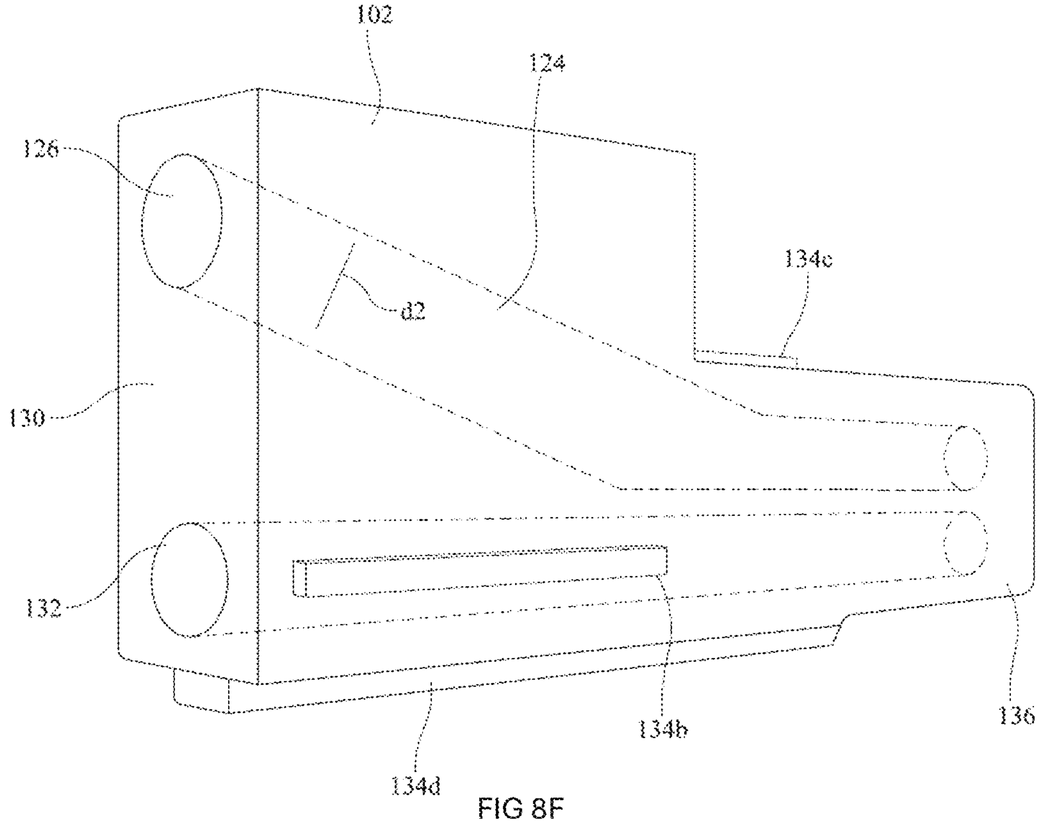

FIGS. 8A-8F show photographs of a non-limiting example of the first embodiment of the G-tube blockage blaster 100, which was 3D printed with a hard plastic. As best seen in FIG. 8B, the first lumen section 124 can exhibit a change in concavity within the hub 102.

Referring now to FIGS. 9-13, a second embodiment of the G-tube blockage blaster 200 is shown. In this embodiment, the G-tube blockage blaster 200 is a one-piece configuration. For ease of explanation, the reference numbers in FIGS. 9-13 correspond to those in FIGS. 1-8 with the addition of one hundred. Also, for ease of illustration, FIGS. 9-13 depict the G-tube blockage blaster 200 without a balloon. However, it is understood that a balloon may be attached or otherwise disposed in the same place on the elongated shaft 204 so as to be inflated from a fluid introduced through the balloon inflation port 226, traveling through the first lumen 212, and entering the balloon through the balloon hole 216.

Figure 9:
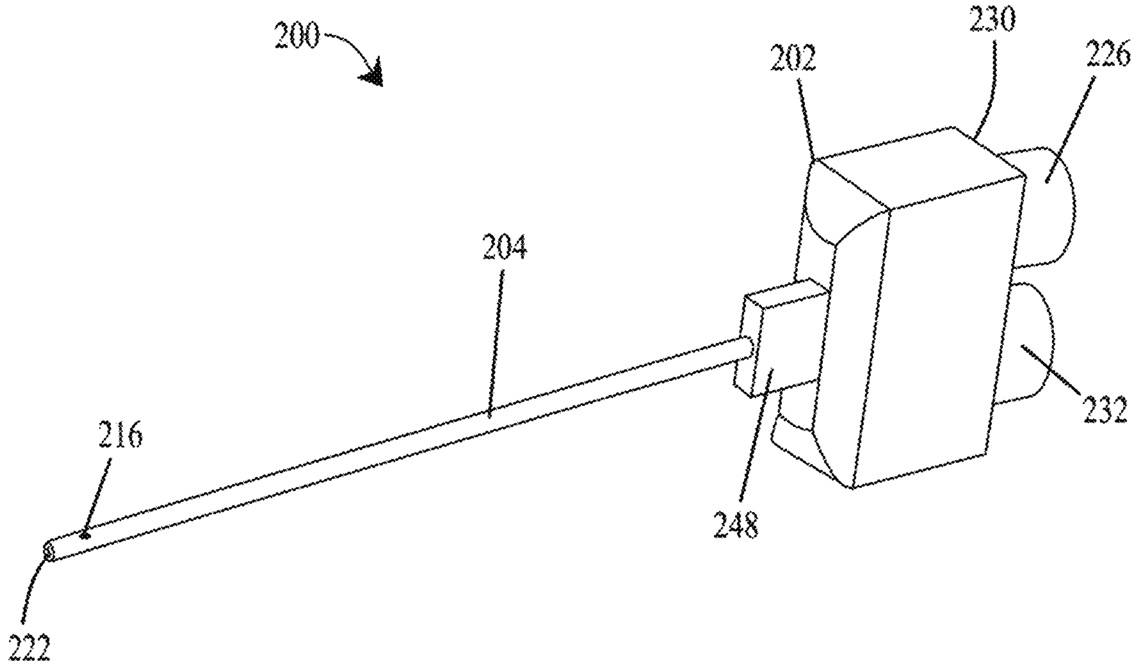
FIG. 9: Corner view of a second embodiment of a G-tube blockage blaster, depicted without the balloon for illustration purposes.
Figure 10:
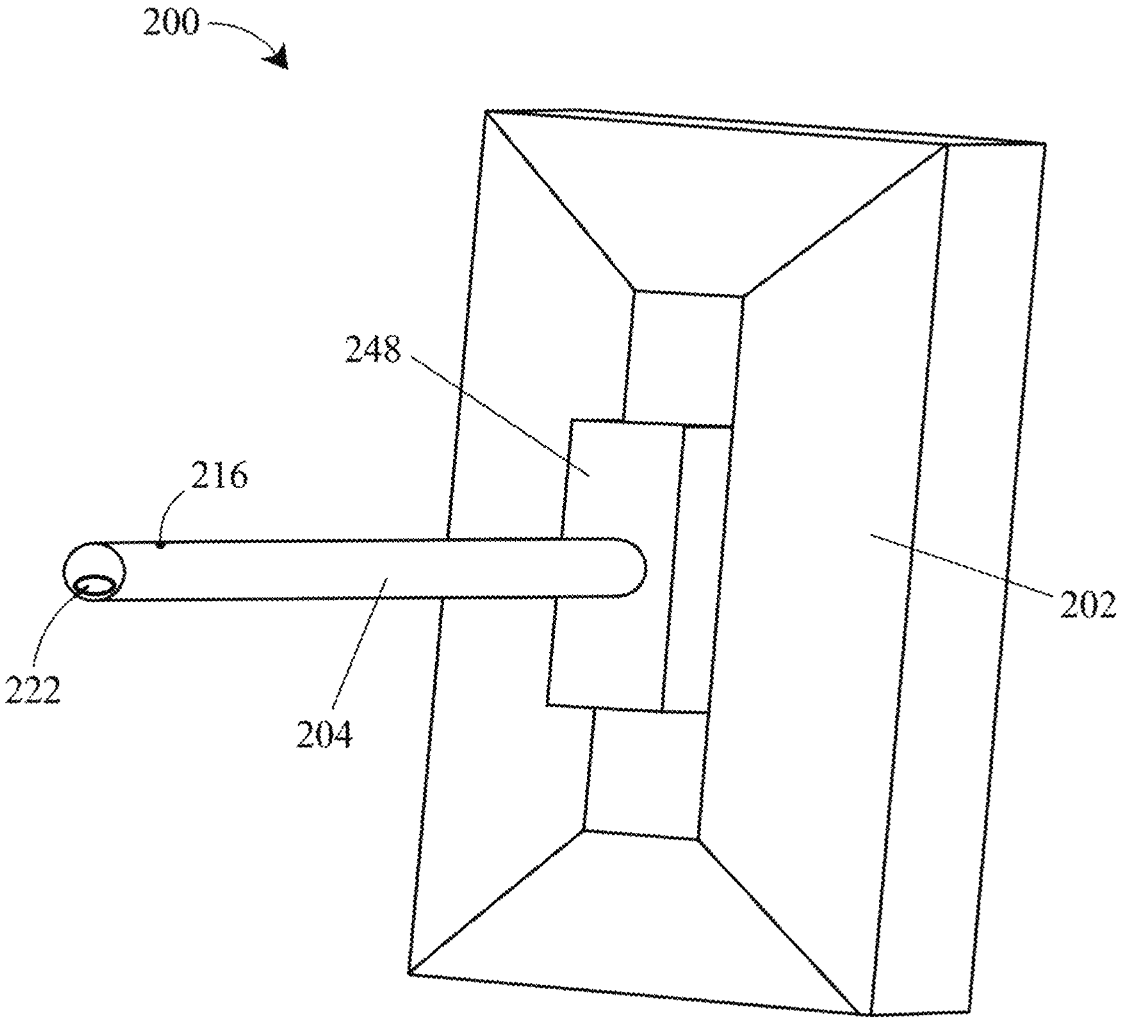
FIG. 10: Distal view of the second embodiment of the G-tube blockage blaster.
Figure 11:
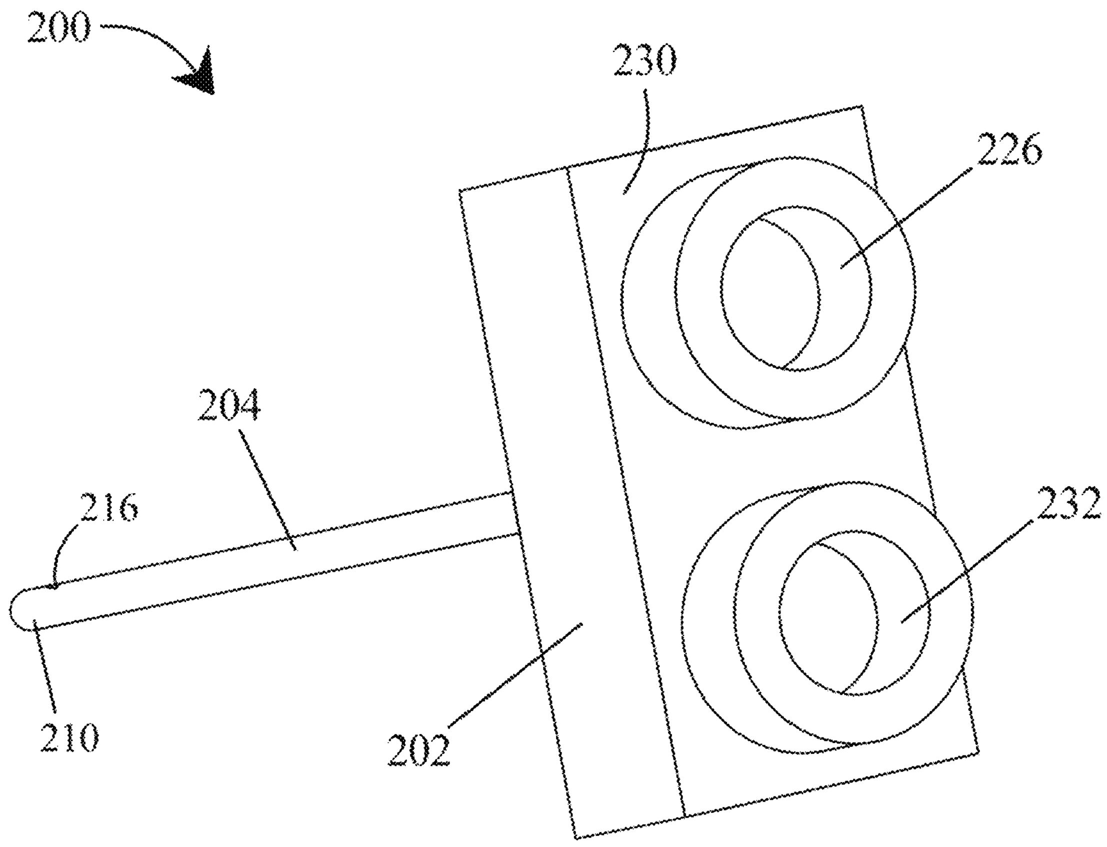
FIG. 11: Proximal view of the second embodiment of the G-tube blockage blaster.
Figure 12:
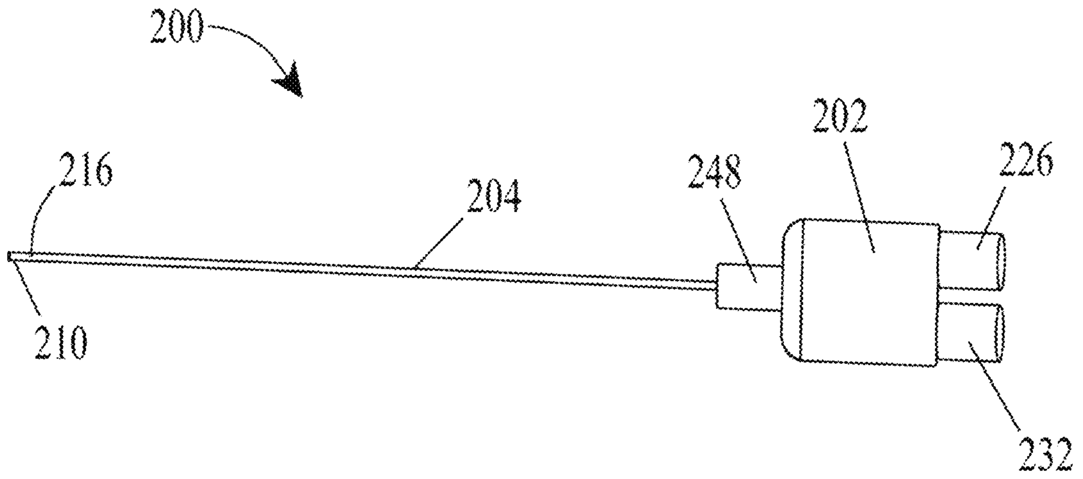
FIG. 12: Side view of the second embodiment of the G-tube blockage blaster.
Figure 13A:
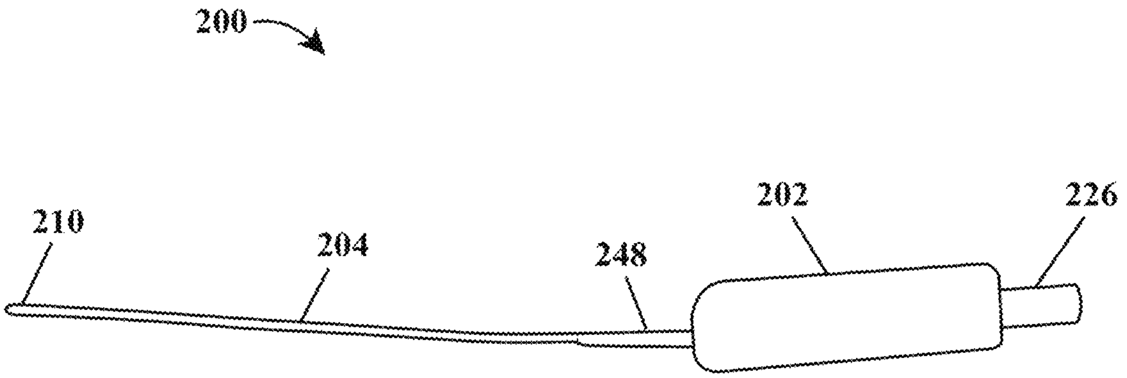
FIGS. 13A-13D: Photographs of a non-limiting example of the second embodiment of the G-tube blockage blaster.
Figure 13B:
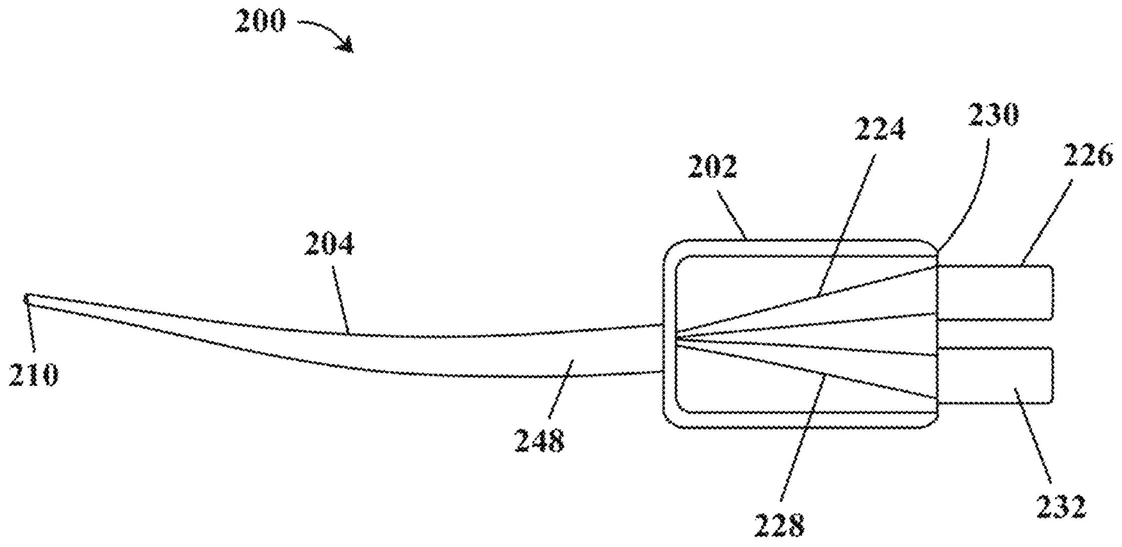
Figure 13C:
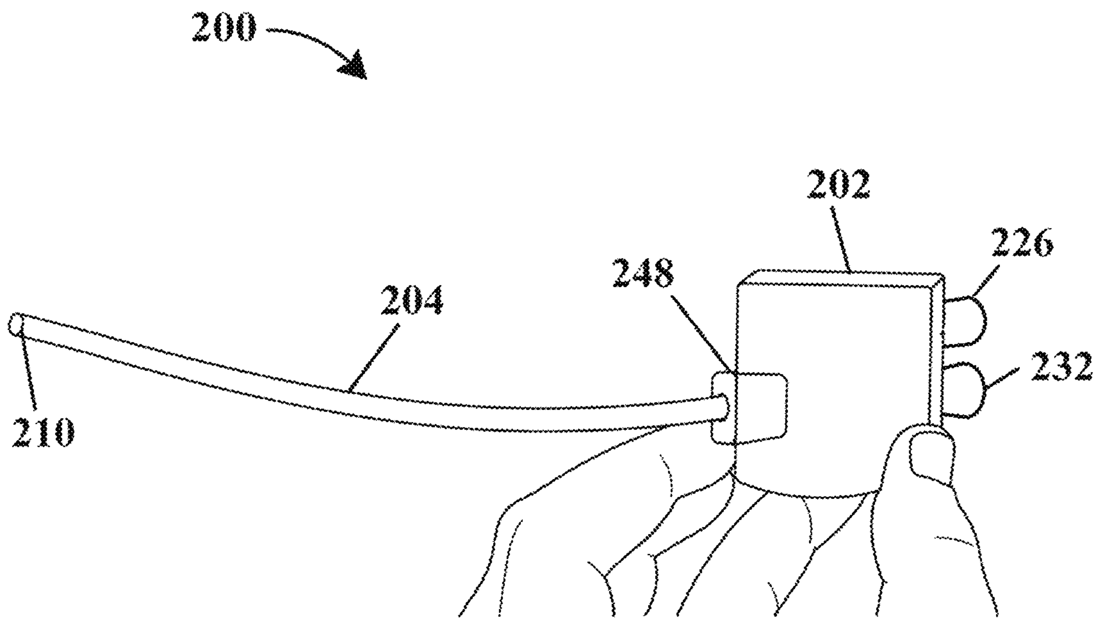
Figure 13D:
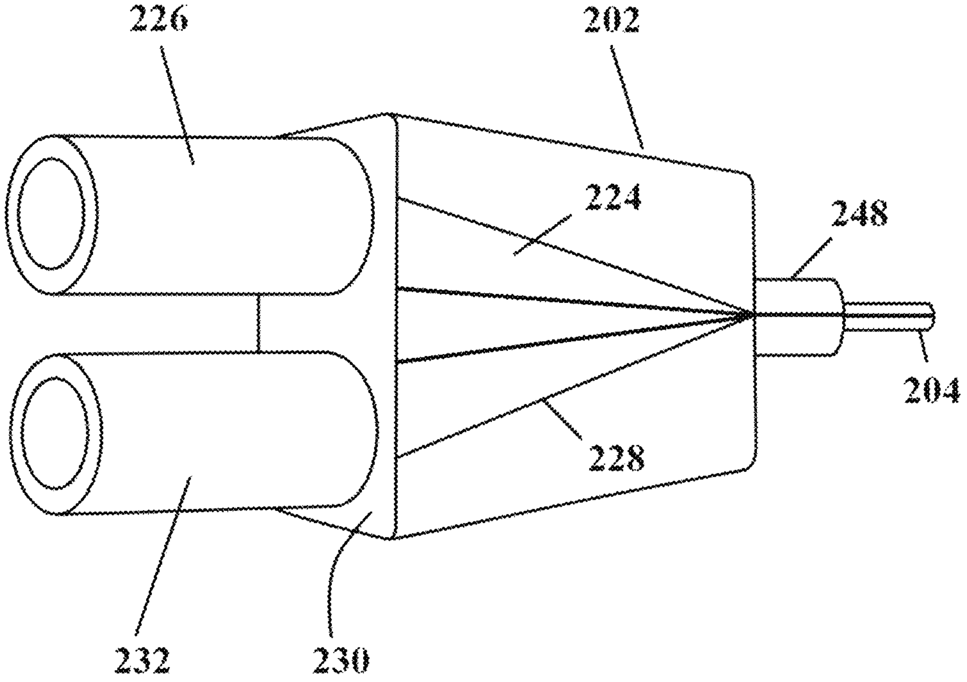

As seen best in FIG. 9, the balloon inflation port 226 and the fluid delivery port 232 may each extend beyond the side 230 of the hub 202 opposite the elongated shaft 204. However, this is not strictly necessary.

In the embodiment depicted in FIGS. 9-13, because the device 200 (minus the balloon) is a single piece, the hub 202 does not include connection clamps or a tube connection member. Rather, the hub 202 and the elongated shaft 204 are integral, made from the same piece of plastic. An intermediate portion 248 is made to facilitate the transition in diameters for the first lumen 212 and the second lumen 214. The intermediate portion 248 has a diameter smaller in size than that of the hub 202, but larger in size than that of the elongated shaft 204.

As seen from FIGS. 11, 12, 13B, 13D, the hub 202 may have both ports 226, 232 on the same surface, on the side 230 opposing the elongated shaft 204. In this embodiment, the first lumen section 224 and the second lumen section 228 extend through the hub 202 as mirror images of one another, extending through the hub 202 at an angle from the intermediate portion 248 to the opposite side 230 of the hub 202 where the balloon inflation port 226 and fluid injection port 232 are. The angle is relative to the plane defined by the elongated shaft 204, as seen best in FIGS. 13B, 13D. Both of the first lumen section 224 and the second lumen section 228 change in diameter within the hub 202, decreasing from the larger diameters of the balloon inflation port 226 and the fluid injection port 232 to the smaller diameters of the first lumen 212 within the elongated shaft 204 and the second lumen 214 within the elongated shaft 204.

In use, the G-tube blockage blaster 100, 200 may effectively and easily clear an obstruction in a G-tube in a patient. The G-tube blockage blaster 100, 200 is simple enough that any medical professional can easily use it to unclog the clogged G-tube without having a surgeon's skill set. The elongated shaft 104, 204 may be inserted into the G-tube and guided distally through the G-tube until the distal end 110, 210 reaches the obstruction. Then, a first fluid may be injected into the first lumen 112, 212 so as to inflate the balloon 106. The inflation of the balloon 106 causes the diameter of the G-tube to increase slightly in an area around the obstruction. This creates the opportunity to forcefully push the obstruction through the G-tube, because it is less stuck by the walls of the G-tube. Furthermore, the inflation of the balloon 106 creates a seal within the G-tube that prevents backflow of fluid toward the proximal end 108, and forces fluid out the distal end of the G-tube. Accordingly, a second fluid may be injected into the second lumen 118, 218 so as to clear the obstruction. The second fluid exits the distal end 110, 210 through the fluid hole 122, 222, and pushes the obstructions distally out of the G-tube, into the stomach of the patient. The second fluid, upon injection out the fluid hole 122, 222, is forced to go in one direction, toward the distal end of the G-tube, because of the seal created by the inflation of the balloon 106, and therefore forces the clog out of the distal end of the G-tube. The amount of second fluid needed to dislodge an obstruction varies on many factors such as the size and density of the obstructions, but generally from 1 to about 20 syringe fulls of second fluid suffice to clear an obstruction. Alternatively, or in addition, the elongated shaft 104, 204, because of its rigid nature, may be distally pushed into the obstruction to help dislodge it. In embodiments in which the G-tube blockage blaster 100, 200 only includes the first lumen 112, the seal created by inflation of the balloon 106 with or without distal pushing of the elongated shaft 104, 204 may be sufficient to clear the obstruction.

The G-tube blockage blaster 100, 200 may be made either as a reusable device, or a single-use device, depending on the materials it is made from. Moreover, certain parts may be made to be detachable so as to have portions of the device be reusable while other portions of the device are not reusable. As one non-limiting example, the hub 102, 202 may be made to be detachable from the elongated shaft 104, 204. As another non-limiting example, the balloon 106 may be detachable and replaceable, and the device 100, 200 may therefore be fabricated and packaged without a balloon 106. However, many other configurations are possible and encompassed within the scope of the present disclosure.

Certain embodiments of the devices and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the devices and methods described herein to various usages and conditions. Various changes may be made, and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A method of clearing a blockage in a G-tube, the method comprising:

inserting an elongated shaft into a G-tube having a blockage therein, wherein the elongated shaft extends from a proximal end to a distal end, and wherein the elongated shaft defines a first lumen and a second lumen, the first lumen extending from the proximal end to a position removed from a tip at the distal end, and the second lumen extending from the proximal end to the distal end;

moving the elongated shaft through an entry opening of the G-tube and distally into the G-tube until the distal end of the elongated shaft reaches the blockage;

injecting a first fluid into the first lumen so as to inflate a balloon attached to the elongated shaft, wherein the balloon is inflated to cause a diameter of the G-tube to increase around the blockage, thus creating a seal between the balloon and the G-tube; and injecting a second fluid into the second lumen so as to push through the G-tube with the second fluid to clear the blockage while the balloon remains in place, wherein the seal prevents backflow of the second fluid towards the proximal end of the elongated shaft.

2. The method of claim 1, wherein the first fluid is water or saline, and the second fluid is water or saline.

3. The method of claim 1, wherein the injecting of the first fluid is conducted with a syringe or a mechanical pump.

4. The method of claim 1, wherein the injecting of the second fluid is conducted with a syringe or a mechanical pump.

5. The method of claim 1, wherein the injecting of the first fluid is conducted with a syringe or a mechanical pump, and the injecting of the second fluid is conducted with a syringe or a mechanical pump.

* * * * *